United States Patent [19]

Sachs

[11] Patent Number: 5,355,626
[45] Date of Patent: Oct. 18, 1994

[54] ACCESS PANEL ASSEMBLY

[75] Inventor: Steve H. Sachs, Torrance, Calif.

[73] Assignee: Sachwin Products, Inc., Torrance, Calif.

[21] Appl. No.: 197,561

[22] Filed: Feb. 14, 1994

Related U.S. Application Data

[63] Continuation of Ser. No. 31,807, Mar. 15, 1993, abandoned.

[51] Int. Cl.$^5$ ............................................... E06B 3/32
[52] U.S. Cl. ........................................ 49/436; 49/380
[58] Field of Search .................. 49/463, 465, 466, 380

[56] References Cited

U.S. PATENT DOCUMENTS

| | | |
|---|---|---|
| 1,044,383 | 11/1912 | Hatch . |
| 1,818,269 | 8/1931 | Olley . |
| 2,352,714 | 7/1944 | Huyssen . |
| 2,793,721 | 5/1957 | Sterud . |
| 3,286,405 | 5/1964 | Schembri . |
| 3,491,486 | 1/1970 | Caruth ............................. 49/463 |
| 3,792,551 | 2/1974 | Hallas ............................. 49/463 |
| 4,890,418 | 1/1990 | Sachs . |

OTHER PUBLICATIONS

Karp Associates, Inc., ACCESS DOORS, 1992, Maspeth, NY (product brochure 1992).
Karp Associates, Inc., EASI-ACCESS PANEL, Jan. 1992.
Do It Yourself Retailing, Oct. 1990.
Exhibit A.
Exhibit B.

*Primary Examiner*—Philip C. Kannan
*Attorney, Agent, or Firm*—Merchant, Gould, Smith, Edell, Welter & Schmidt

[57] ABSTRACT

An access panel assembly with a door and multi-functional frame which prevents sagging and warping of the door from the frame, and which is more safely and easily installed in both new and existing building structures. Flush mounting of the door to either face of the frame is achieved by a symmetrical mechanism wherein the inner edge of all four sides of the frame opening contains a molded, shallow groove which is equidistantly located from the two faces of the frame. The door contains on its underside a plurality of molded tabs, wherein each edge of the door has one or more tabs located adjacent thereto. The molded tabs are resilient so that they deflect when the door is press-fitted into the frame from either face. The molded tabs slide into the shallow grooves and hold the door firmly in place. Further, the door also contains one or more knockouts on the underside thereof, wherein each knockout is positioned near an edge of the door. The knockouts can be punched out, thereby creating a through hole so that electrical wiring, conduit, or plumbing access may be passed through the door.

6 Claims, 3 Drawing Sheets

ACCESS PANEL ASSEMBLY

This is a continuation of application Ser. No. 08/031,807, filed Mar. 15, 1993, which was abandoned upon the filing hereof.

BACKGROUND OF THE INVENTION

1. Field of the Invention

This invention relates generally to an improvement in wall access panel assemblies used in building construction.

2. Description of Related Art

Wall access panel assemblies are well known in the art. Typically, such assemblies are used in building construction to provide access to various utility fixtures most commonly plumbing fixtures. One such prior art assembly is shown in U.S. Pat. No. 4,890,418, issued Jan. 2, 1990, to Steve H. Sachs, and incorporated by reference herein. The assembly shown in U.S. Pat. No. 4,890,418 is reversible and has a frame that can be installed during new home construction or during aftermarket repairs. The door is press-fit within the frame, and generally fits snugly.

One problem exists with the assembly of U.S. Pat. No. 4,890,418 in that the doors have a tendency to sag or warp when the assembly is embedded in ceilings and gravity forces the door downward. This is especially true in hot or humid spaces that may cause an expansion of the assembly. The design of the door also contributes to the problem, because only two tabs, on opposing edges of the door, are used to secure the door in the frame.

Another problem exists with the assembly of U.S. Pat. No. 4,890,418 in that it does not provide knock-outs for threading plumbing, electrical wiring, or conduit through the door.

SUMMARY OF THE INVENTION

To overcome the limitations in the prior art described above, and to overcome other limitations that will become apparent upon reading and understanding the present specification, the present invention discloses an improved access panel assembly with a door and multi-functional frame which prevents sagging and warping of the door from the frame and which is more safely and easily installed in both new and existing building structures. Flush mounting of the door to either face of the frame is achieved by a symmetrical mechanism wherein the inner edge of all four sides of the frame opening contains a molded, shallow groove which is equidistantly located from the two faces of the frame. The door contains on its underside a plurality of molded tabs, wherein each edge of the door has one or more molded tabs located adjacent thereto. The molded tabs are resilient so that they deflect when the door is press-fitted into the frame from either face. The molded tabs slide into the shallow grooves and hold the door firmly in place. Further, the door also contains one or more knockouts on the underside thereof. The knockouts can be punched out, thereby creating a through hole so that electrical wiring, conduit, or plumbing access may be passed through the door.

DESCRIPTION OF THE DRAWINGS

Referring now to the drawings in which like reference numbers represent corresponding parts throughout.

DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
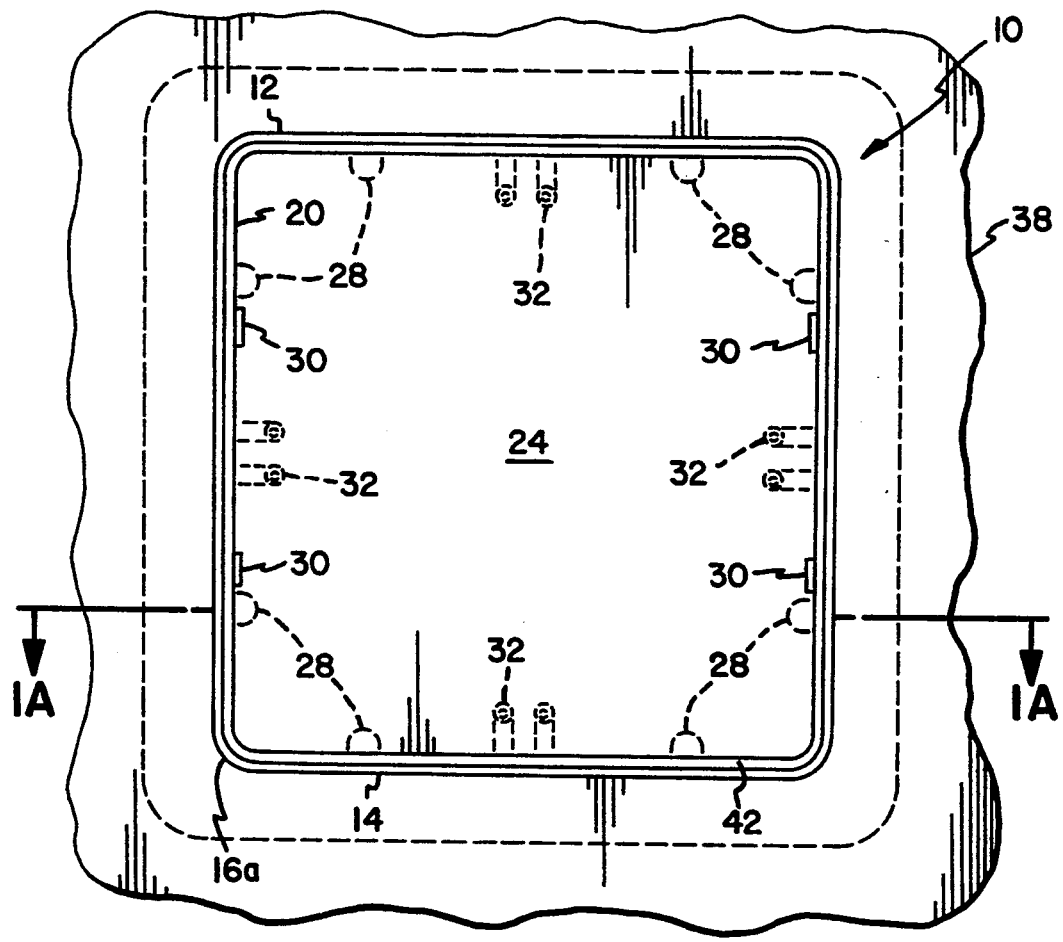
FIG. 1 illustrates the improved panel assembly installed in a new building structure.

FIG. 1 shows a preferred embodiment of the invention comprising an improved access panel assembly 10. The frame 12, as more clearly illustrated in FIG. 1A, includes a narrow edge 14 and a wide edge 16 having rounded corners 16a and tapered edges 18. Along the inner edge 20 of the frame 12 is a symmetrical shallow groove 22, preferably equidistantly spaced from the two faces of the frame 12. The shallow groove 22 is formed in each of the four inner edges 20 of the frame 12 to provide easy alignment of a door 24 in the frame 12 for square assemblies.

The door 24 is typically fabricated from a single piece of the same material as the frame 12. Incorporated in the door 24 on its underside 26 on all of the four opposing edges of the door 24 are four pairs of molded protuberances typically referred to as tabs 28 (or dogs), each pair being positioned opposite the other. The four molded tabs 28 securely hold the door 24 in place, and prevent any sagging or warping of the door 24 from the frame 12, especially when the panel assembly 10 is used in ceilings. Further, each of these molded tabs 28 is somewhat resilient to accommodate deflection when being press-fitted into the shallow groove 22. Those skilled in the art will recognize that any number of tabs 28 could be substituted for the configuration show, so long as there is at least one tab located adjacent each edge of the door 24.

Figure 1A:
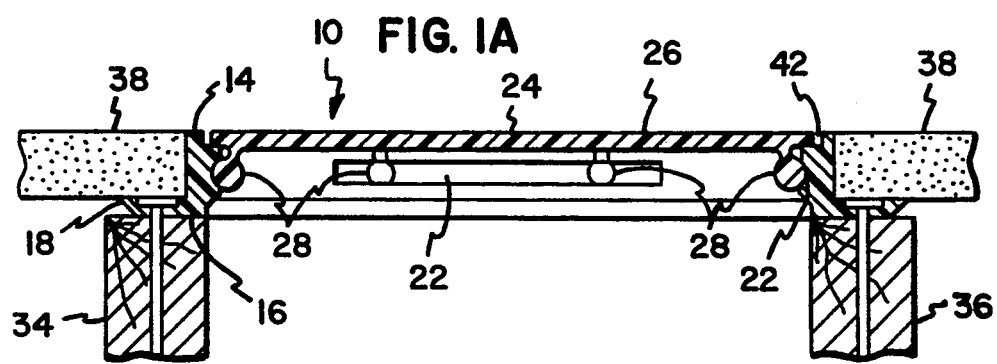
FIG. 1A is a sectional view of FIG. 1 illustrating the mounting of the multi-functional frame to joists and the surrounding surface-forming material.

Also incorporated on the underside 26 of the door are one or more knockouts 32. Each of these knockouts 32 is preferably somewhat perforated so they can be punched out easily using a screwdriver, awl or other tool. Once the knockouts are punched out, electrical wiring, conduit, or plumbing can then be passed through the door 24 via the knockouts 32. In the embodiment of FIGS. 1 and 1A, four pairs of knockouts 32 are shown on four opposing edges of the door 24, wherein each pair of knockouts 32 is positioned opposite the other and between each pair of tabs 28. Of course, those skilled in the art will recognize that any number or combination of knockouts 32 could be substituted for the configuration shown.

The thickness of the door 24 is equal to the depth of the recess 42 on the frame 12, so that the door 24 and frame 12 provide a flush-fit panel assembly when the door 24 is press-fitted in the frame 12 from either side. The equidistant shallow groove 22 and the equally sized recess 42 in combination with the thickness of the door 24 provides the multi-functional feature of the frame 12 which allows the alternative installation of the door 24 from either face of the frame 12, i.e., from either the narrow edge face 14 or the wide edge face 16.

The door 24 also includes four indentations or recesses 30 which are located in the outside surface of the door 24 near the molded tabs 28. These indentations are suitable for receiving a tool such as a screw driver or a knife to pry the door 24 open after it has been press-fitted into the frame 12.

Figure 2:
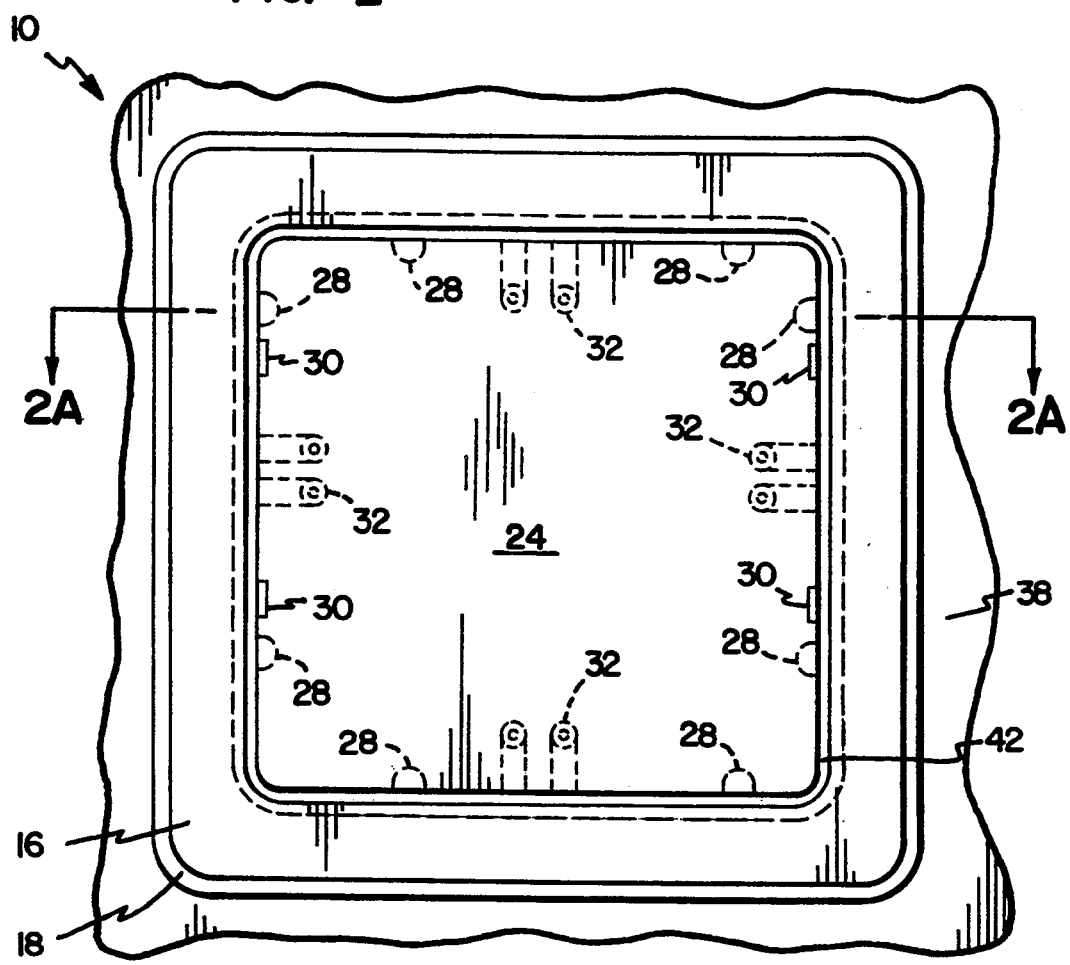
FIG. 2 illustrates the improved panel assembly installed in an existing building structure.
Figure 2A:
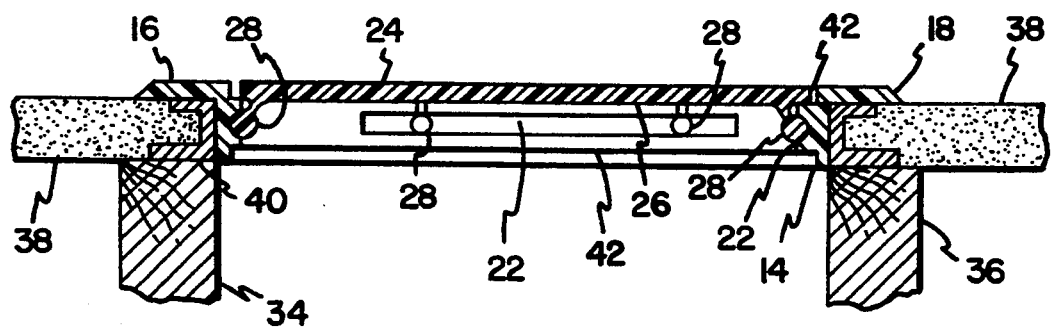
FIG. 2A is a sectional view of FIG. 2 illustrating the insertion of the frame of the improved panel assembly in the frame of the prior art metallic unit.

FIG. 2 illustrates the improved panel assembly 10 installed in an existing building structure. When installing the multi-functional frame 12 in new construction, it is affixed to adjoining studs 34 and 36. In existing structures with installed prior art assemblies, the improved access panel assembly 10 may be readily installed. First, the prior assembly, if it is still attached, are removed. The frame 12 of the improved assembly is rotated 180 degrees as compared to its orientation for new construction such that its narrow edge face 14 is inserted into the opening in an old frame 40 which is left in place as shown in FIG. 2A. The frame 12 may be secured within the old frame 40 by any suitable adhesive material such as an acrylonitrile based adhesive. The door 24 is then inserted into the opening in the frame 12 to form the flush-mounted door and frame access panel assembly 10.

Figure 2B:
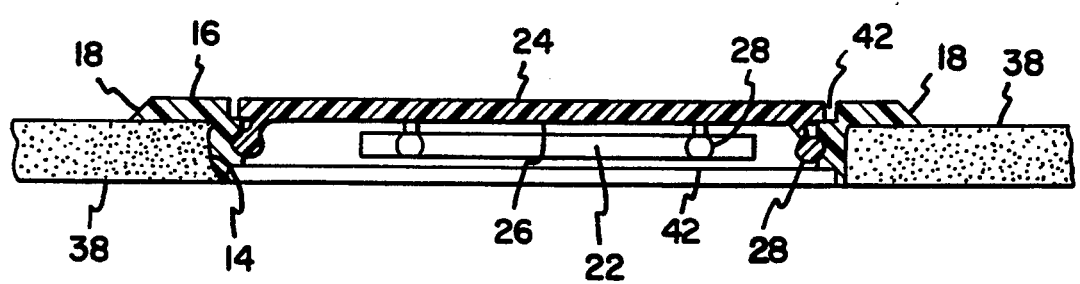
FIG. 2B is a sectional view of FIG. 2 illustrating an alternative mounting of the improved panel assembly directly in a surface-forming material of an existing structure.

An additional advantage provided by the improved panel assembly 10 is its use in directly mounting the frame 12 to the surrounding surface-forming material 38 when there are no studs or joists within the area that an access panel is desired to be mounted. This alternate mounting feature of the new assembly 10 is illustrated in FIG. 2B. It will be noted that the frame 12 is oriented in the same manner as that shown in FIG. 2A, i.e., the narrow edge face 14 inserted into the opening made in the surface-forming material 38 and the wide edge face 16 rests atop the surface-forming material 38. The frame 12 is secured to the surface-forming material 38 with a suitable adhesive material and the door 24 is press-fitted into the frame 12 opening with the tabs 28 engaging the shallow grooves on opposite sides of the opening to hold the door 24 firmly in place within the frame 12.

In conclusion, the improved access panel assembly 10 is a novel structure comprising a single-piece, molded door 24 and a multi-functional, single-piece, molded frame 12 with a unique looking mechanism consisting of four shallow grooves 22 molded into the frame 12, a plurality of resilient tabs 28 molded into the door 24 and located adjacent each edge thereof, and one or more knockouts 32. The location of the shallow grooves 22 equidistant between the opposing faces of the frame 12 and the equal depths of the recesses from both the narrow edge face 14 and the wide edge face 16 being equal to the thickness of the door 24 enables the door 24 to be flush-mounted to either face of the frame 12, thereby combining with the other novel features of this assembly 10 to provide a significant improvement over prior art panel assemblies.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An access panel assembly, comprising:
   (a) a frame having two faces and a groove located equidistantly between the faces; and
   (b) a door, press-fitted within the frame, wherein one or more resilient tabs are located adjacent to each edge of the door for engagement with the groove of the frame.

2. The access panel of claim 1, wherein the two faces of the frame comprise a narrow edge face and a wide edge face, and the frame is reversible, so that the door can be flush-mounted with either the narrow edge face or the wide edge face of the frame.

3. The access panel of claim 1, wherein the door further comprises at least one perforated knockout suitable for being punched out, wherein electrical wiring, conduit and plumbing can be passed through the door via the knockout.

4. An access panel assembly, comprising:
   (a) a frame having two faces and a groove located equidistantly between the faces; and
   (b) a door, press-fitted within the frame, wherein one or more resilient tabs are located on the door for engagement with the groove of the frame, and further, wherein the door further comprises at least one perforated knockout suitable for being punched out, wherein electrical wiring, conduit and plumbing can be passed through the door via the knockout.

5. The access panel of claim 4, wherein the two faces comprise a narrow edge face and a wide edge face, and the frame is reversible so that the door can be flush-mounted with either the narrow edge face or the wide edge face of the frame.

6. The access panel of claim 4, wherein the tabs further comprise one or more resilient tabs located adjacent to each edge of the door for engagement with the groove of the frame.

* * * * *